T. E. MURRAY.
METHOD OF TRUING AND REMOVING EXTRUDED BURS FROM ELECTRICALLY WELDED WORK.
APPLICATION FILED OCT. 25, 1918.
1,320,893.  
Patented Nov. 4, 1919.
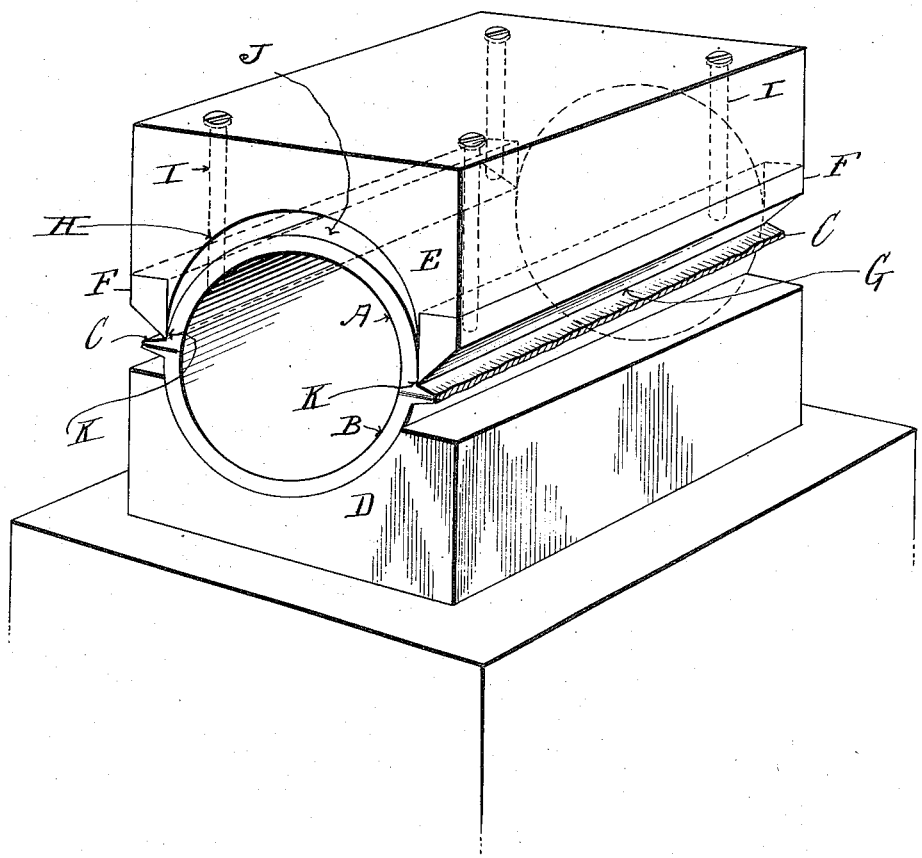
Inventor  
Thomas E. Murray  
By his Attorney

UNITED STATES PATENT OFFICE.

THOMAS E. MURRAY, OF NEW YORK, N. Y.

METHOD OF TRUING AND REMOVING EXTRUDED BURS FROM ELECTRICALLY-WELDED WORK.

1,320,893.　　　　　Specification of Letters Patent.　　Patented Nov. 4, 1919.

Application filed October 25, 1918. Serial No. 259,621.

*To all whom it may concern:*

Be it known that I, THOMAS E. MURRAY, a citizen of the United States, residing at New York, in the county of New York and State of New York, have invented a certain new and useful Improvement in Methods of Truing and Removing Extruded Burs from Electrically-Welded Work, of which the following is a specification.

When an object, such as a cylinder, formed of two longitudinal half sections of sheet or plate metal is produced by placing the straight edges of said sections in registry and electrically welding said edges together, certain small distortions of the work may occur, and in addition burs are extruded at the joints. My present invention is a method of truing the work and also of both truing the work and removing the burs at a single operation.

The accompanying drawing is a perspective view of the truing and bur trimming apparatus set forth in U. S. Letters Patent No. 1,286,064, granted to me November 26, 1918, wherein my hereinafter described method may be carried into effect.

The object to be trued and trimmed is here a cylinder formed of two longitudinal half sections A, B of plate or sheet metal which are placed with their straight edges in registry and electrically welded under pressure, so that burs C are extruded along the joints. In order to true this cylinder and to remove the burs, I seat said cylinder in a semi-cylindrical recess in a lower molding die G. A movable upper molding die E, which is placed above and separated from the lower die, is shouldered to receive knives F. The inner flat sides of the knives are vertical and tangent to the upper half section A of the cylinder, so that the inclined cutting edges G of said knives come directly above the burs and are close to the surface of said section. In the upper die E and terminating at the flat inner surfaces of the knives is a semi-cylindrical recess H—said knives therefore extending below said recess. Said knives are secured in the shouldered edges of die E by screws I passing down through the body of said die. By releasing said screws, said knives may be removed for replacement or repair.

The operation is as follows:

At the outset, the position of the parts is substantially as shown in the drawing. That is, the upper half section A of the cylinder is not seated in the recess of the upper die, but there is a crescent-shaped clearance J above said half section. The knives F are in contact with the burs C only at points K at their corresponding extremities.

As the upper die E is forced down, the knives, by reason of their inclined edges, cut the burs C from the cylinder progressively from one end of said cylinder to the other. At the same time, the pressure of said knives forces the lower half section B of the cylinder into the semi-cylindrical recess in the lower die D and does so progressively because the action of the knives on the burs is, as I have stated, progressive. As the burs are cut away, the upper die E comes down into contact with the upper half section A of the cylinder, the clearance J disappearing: so that finally, after the burs C have been completely sheared off, the whole cylinder is firmly seated and pressed in the recesses of the molding dies D and E, and are so caused to assume the truly cylindrical shape of said recesses conjointly.

Where it is not desired to trim off the bur and true the work at a single operation—as, for example, when the bur is cut off separately in advance of the truing— then the knives F may be removed and the cylinder trued by seating it in the recesses in the dies and forcing said dies together as before, so that the cylinder becomes compressed between them and so brought into truly cylindrical shape.

I claim:

1. The method of truing and simultaneously removing the extruded burs from a hollow cylinder formed in two sections disposed in registering contact and electrically welded at their straight meeting edges, which consists in progressively shearing off said burs and simultaneously subjecting said cylinder to pressure between molding dies having semi-cylindrical recesses receiving said cylinder.

2. The method of truing a cylinder formed in two longitudinal half sections disposed in registering contact and electrically welded at their straight meeting edges, which consists in subjecting said cylinder to pressure between molding dies having semi-cylindrical recesses receiving said cylinder.

In testimony whereof I have affixed my signature in presence of two witnesses.

THOMAS E. MURRAY.

Witnesses:
GERTRUDE T. PORTER,
MAY T. McGARRY.